United States Patent
Christensen et al.

(10) Patent No.: US 7,313,299 B2
(45) Date of Patent: Dec. 25, 2007

(54) LASER BEAM TRANSFORMATION AND COMBINATION USING TAPERED WAVEGUIDES

(75) Inventors: Scott E. Christensen, Boulder, CO (US); Iain T. McKinnie, Denver, CO (US); Josef Robert Unternahrer, Lafayette, CO (US)

(73) Assignee: Lockheed Martin Coherent Technologies, Inc., Louisville, CO (US)

( * ) Notice: Subject to any disclaimer, the term of this patent is extended or adjusted under 35 U.S.C. 154(b) by 0 days.

(21) Appl. No.: 11/371,891

(22) Filed: Mar. 9, 2006

(65) Prior Publication Data
US 2007/0211995 A1    Sep. 13, 2007

(51) Int. Cl.
*G02B 6/26* (2006.01)
(52) U.S. Cl. .............................. 385/27; 385/28; 385/43
(58) Field of Classification Search ............ 385/27–29, 385/39, 46, 58; 372/6, 9, 26, 31; 359/333, 359/349
See application file for complete search history.

(56) References Cited

U.S. PATENT DOCUMENTS

| | | | |
|---|---|---|---|
| 3,832,029 A | 8/1974 | Bryngdahl | |
| 4,087,159 A * | 5/1978 | Ulrich | ......................... 385/129 |
| 4,345,212 A | 8/1982 | Seppala et al. | |
| 4,794,345 A | 12/1988 | Linford et al. | |
| 4,933,649 A | 6/1990 | Swanson et al. | |
| 4,982,166 A | 1/1991 | Morrow | |
| 5,172,264 A | 12/1992 | Morrow | |
| 5,396,570 A | 3/1995 | Jenkins et al. | |
| 5,862,288 A | 1/1999 | Tayag et al. | |
| 6,125,228 A | 9/2000 | Gong | |
| 6,167,075 A * | 12/2000 | Craig et al. | ................... 372/75 |
| 6,385,228 B1 | 5/2002 | Dane et al. | |
| 6,697,192 B1 | 2/2004 | Fan et al. | |
| 6,801,691 B2 * | 10/2004 | Berini | ........................ 385/39 |
| 6,894,828 B2 | 5/2005 | Pelouch et al. | |
| 7,043,104 B1 * | 5/2006 | Bratkovski et al. | ........... 385/12 |
| 2002/0114572 A1 | 8/2002 | Bouda | |
| 2003/0063884 A1 * | 4/2003 | Smith et al. | ................. 385/129 |
| 2004/0105644 A1 * | 6/2004 | Dawes | ........................ 385/129 |

* cited by examiner

*Primary Examiner*—Hemang Sanghavi
(74) *Attorney, Agent, or Firm*—McDermott Will & Emery LLP

(57) ABSTRACT

A system for transmitting the spatial profile of laser beams with particular applicability to coherently combine laser beams into one beam. The system includes a tapered waveguide with an inlet and outlet at ends of two waveguide elements each having a reflective surface facing into the waveguide. The reflective surfaces are non-parallel such that the inlet height is different than the outlet height, e.g., inlet height greater than outlet height. The system includes a beam input assembly controlling phases of laser beams input at the waveguide inlet, and the phases of the beams are locked to a substantially single phase. The waveguide length is selected to produce at the waveguide outlet a coherently combined laser beam from the input beams. The beam input assembly includes a laser beam source, a beam splitter generating lower power beams from source beams, and phase adjusters for controlling the phase of each input beam.

20 Claims, 12 Drawing Sheets

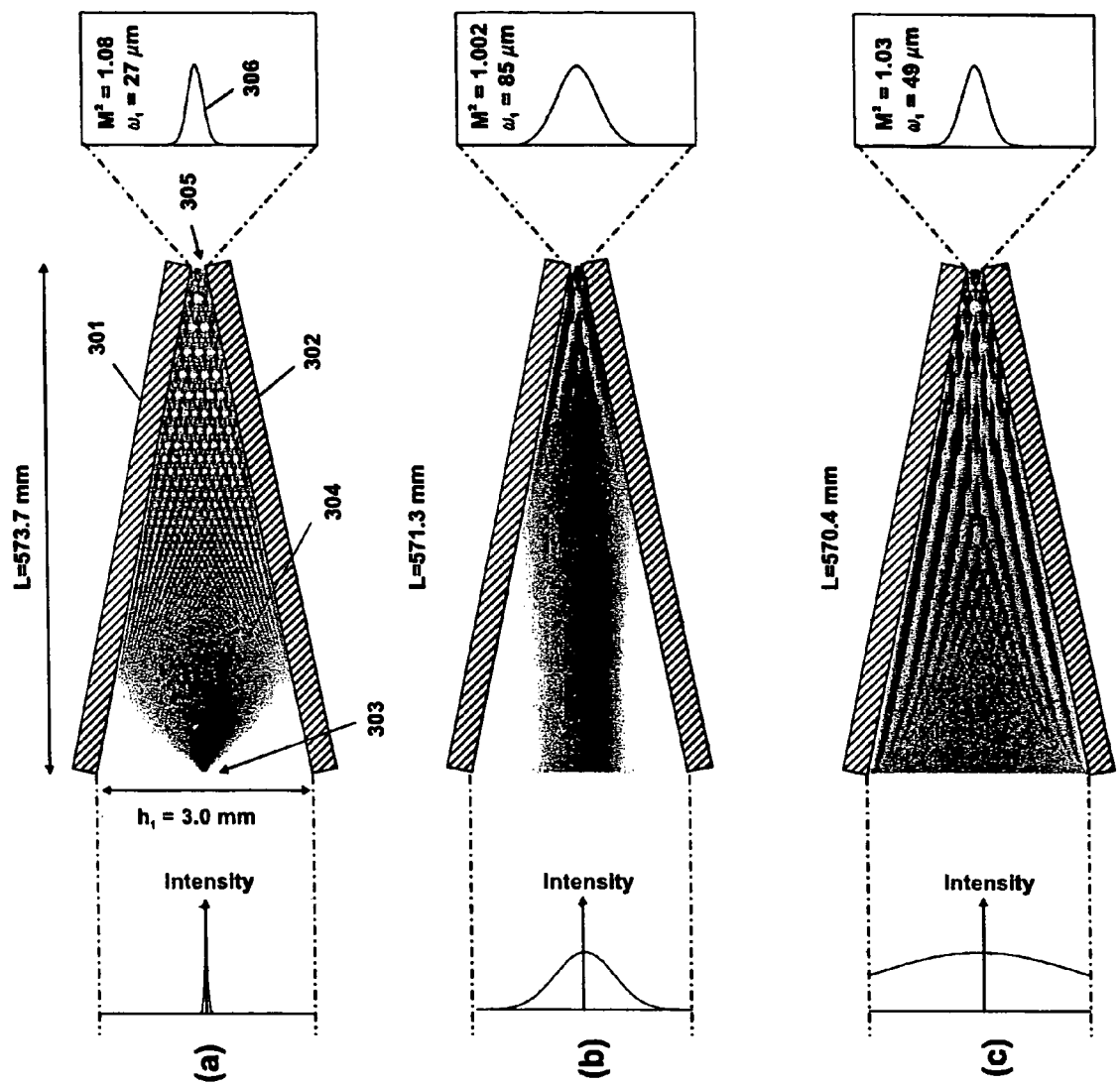

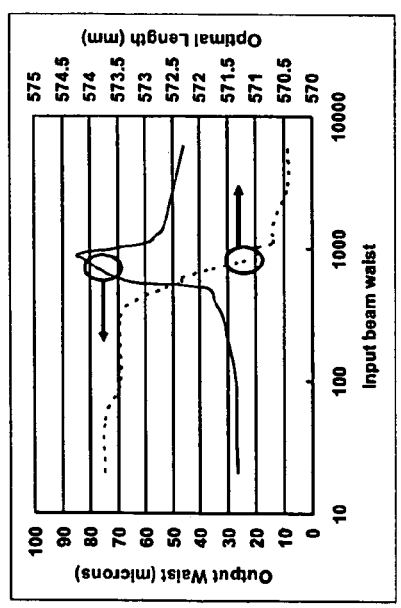
(d)
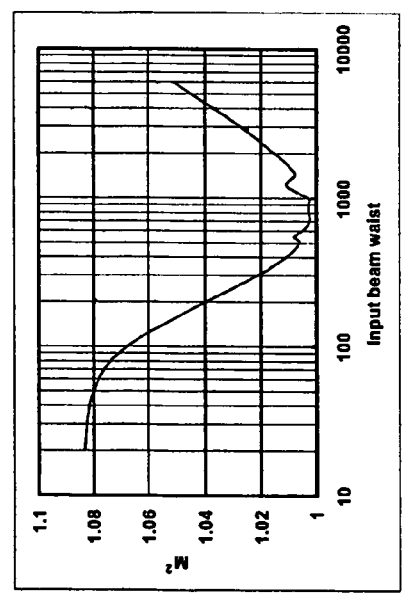
(e)
Fig. 3

LASER BEAM TRANSFORMATION AND COMBINATION USING TAPERED WAVEGUIDES

BACKGROUND OF THE INVENTION

1. Field of the Invention

This invention is directed generally to the field of lasers and optics, and more specifically, to methods and apparatus for transforming the transverse profile of laser beams and for coherently combining multiple separate beams into one beam using tapered waveguides.

2. Relevant Background

Directed energy weapons (DEW) based on delivery of laser energy to a target have been pursued for many years. Such laser beams must meet stringent criteria that include scalability to very high powers (e.g., powers of hundreds of kilowatts (KWs) to a megaWatt (MW) or more) in order to deliver sufficient cumulative energy on a target. DEW laser beams also require nearly diffraction limited beam quality to minimize the illuminated area at the target. Producing such beams from a single laser source is very difficult. The difficulties are due in part to the fluence (power or energy per unit area) often being high enough to destroy optics or optical components in the beam path. This is not surprising since a primary intent of DEW lasers is to produce destructive fluence (e.g., high power or energy per unit area). One clear objective for a designer of a DEW or other high energy laser is to generate high energy or destructive fluence at the target but not in the laser beam generator itself.

Another difficulty in creating beams of very high powers is that it is generally the case that beam quality degrades as laser power levels are increased. This degradation with increasing power frequently is a consequence of thermally induced distortions. Poor beam quality causes the laser area at the target to be larger than it would be for a perfect or non-distorted beam and consequently, in distorted or lower quality beams the fluence is reduced. As a result of these considerations, considerable effort has been directed to devising methods to combine the outputs from multiple lower power lasers into a single high power beam. In this description, the term "power" is typically used but may be thought of as meaning the more general phrase of "power or energy." In creating a high power laser, the quantity that is measured or that matters more is normally energy delivered to a target area. High energy delivery can be achieved through highly energetic short duration pulses or through lower peak power pulses of long duration that in some cases last several seconds or more.

One significant consideration in combining beams to produce high power or energy is scalability, e.g., many separate sources often must be combined. A number of beam combination methods have been disclosed that rely on polarization combining two beams (see, for example, U.S. Pat. Nos. 4,982,166 and 5,172,264 to Morrow), but such combination methods are of little use for DEW applications which typically involve the combination of many beams.

Additionally, several scalable beam combination methods have been devised that can be divided into two broad categories: those relying on phased array concepts and those relying on spectral beam combination. Other non-scalable techniques do exist (e.g., temporal stacking of multiple pulses as described in U.S. Pat. No. 4,345,212 to Seppala and Haas), but these techniques require specific pulse formats and complex arrangements to implement. Phased array (PA) concepts rely on the creation of multiple laser beams whose phase can be controlled to a sufficiently high degree such that interferometric methods can then be utilized to combine the multiple beams into a single beam. Spectral beam combination techniques, on the other hand, use dispersive optical elements such as diffraction gratings to cause laser beams at different wavelengths to propagate in a single direction as one beam. Examples of spectral beam combination techniques have been disclosed in U.S. Pat. No. 6,697,192 to Fan et al. for example.

While some argue that spectral beam combination is generally superior, this technique has not proven useful or superior in many applications. For example, certain high-power applications, such as long-range coherent laser radar (ladar) applications, require the radiation to be single frequency, which precludes use of spectrally diverse methods. Another problem in implementing these techniques is that spectral beam combination requires an optical element to be inserted into the multiple beams, which then becomes susceptible to damage. As noted above, DEW applications are aimed at generating sufficient optical power to destroy objects. Hence, the placement of objects in the beam path is a great concern. One reason this issue is frequently not addressed by developers of spectral beam combination systems is that laboratory demonstrations are generally aimed at demonstrating physics principles rather than operational high power laser systems and are carried out at comparatively low power levels. Specifically, current combination demonstrations are generally performed at total power levels measured in watts or at most hundreds of Watts, which is at least 3-5 orders of magnitude lower than what is required for operational DEW and other high power beam systems.

The same scalability and damage issues also apply to existing phased array or PA concepts. One subset of PA concepts uses diffractive elements, in particular phase gratings, to combine multiple beams. The general idea is that a phase grating can be constructed such that a single incident beam is split into multiple diffractive orders. By using this arrangement, reverse multiple beams interfering in a phase grating can be combined into a single beam. An example of such a method is disclosed in U.S. Pat. No. 4,933,649 to Swanson et al.

A second subset of PA concepts uses phase conjugation, e.g., conjugation based on stimulated Brillouin scattering or SBS, to phase lock multiple sources. Such concepts are disclosed, for example, in U.S. Pat. No. 6,385,228 to Dane and Hackel and U.S. Pat. No. 4,794,345 to Linford et al. However, as with spectral beam combiners and phase gratings, these approaches require insertion of optical elements into the beams, which is undesirable in DEW and other similar systems.

A third type of phased array is similar to phased arrays used in microwave radar as well as radio-telescopes. In these designs, multiple parallel beams are placed side by side to form a large area. Locking the phases of the individual beams to a common value ensures that the beam acts like a single beam with a larger area. A limitation of this approach is that of side lobes, which lead to energy deposition outside the intended target area. This represents an efficiency loss on the one hand and may also lead to collateral damage at unintended locations hit by the high power laser beam if this type of PA were used in a DEW system.

From the above discussion, it is clear that beam combination methods that do not require insertion of objects in the beam would be advantageous. The use of hollow waveguides to combine two beams has been demonstrated at low power by Jenkins and Devereux in U.S. Pat. No. 5,396,570, but the described method only discloses a method for combining Gaussian beams rather than a combination method for more general transverse intensity distributions. Gaussian profile beams are useful in many optical situations but are in other applications undesired because they have wide "tails" that prevent multiple beams from being positioned in proximity without interference. Truncation of laser beams produces intense, localized "hot spots" through diffraction, which are detrimental to safe scaling of the laser power to high levels. A further property of Gaussian beams is that they always remain Gaussian as they propagate through linear devices including mirrors, prisms, and lenses. More general beams, including super-Gaussian beams, do not behave in this manner, and consequently, a device that works with Gaussian beams often will not work in the same manner with a non-Gaussian beam. For example, the Fourier transform of a Gaussian beam is still Gaussian, whereas the Fourier transform of a higher order super-Gaussian beam is not super-Gaussian. Since imaging systems generally produce Fourier transformations (for example, the light distribution at the focal plane of a lens is the Fourier transform of the light distribution one focal length in front of the lens), it is not a priori a given that the appearance of a Gaussian beam profile is also an indication of a true imaging condition. Furthermore, a number of limitations arise from the waveguide geometry taught in the Jenkins patent that makes it difficult and cumbersome to apply for operational high power lasers. Another limitation of the Jenkins patent, as well as other existing waveguide configurations, is that they do not teach methods to carry out coherent combination of beams that are not a priori mutually coherent. Simply inputting multiple beams into a combiner without adequate phase control is not sufficient to ensure the emergence of a single coherent beam.

Waveguides are increasingly used in very low power telecommunications systems. In this area, several devices have been disclosed that perform certain beam splitting or beam combination functions but do not enable operation of a high power laser at high efficiency. Such devices include a hexagonal geometry device described in U.S. Pat. NO. 6,125,228 which uses "kaleidoscope" effects to produce multiple beams and is aimed at wavelength division multiplexing (WDM) and similar low power applications. A further example of an integrated optical device for WDM applications is disclosed by Tayag and Batchman in U.S. Pat. No. 5,862,288. Another tapered waveguide device is described by Bouda in U.S. Patent Application 2002/0114572 A1. This device uses non-adiabatically tapered waveguides to produce beam splitting functions with an integrated optical device. The non-adiabatic waveguide is essential to the described device in order to produce a uniform illumination of multiple subsequent waveguides, but such a waveguide may be highly detrimental to the beam combination devices developed for DEW or other high power beam systems. For example, Bouda illustrates coupling from one input beam to a multiplicity of output beams where the coupling loss is measured in several decibels (dB). One dB equals 21% loss and 2 dB equals approximately 37% loss. Such high losses may be acceptable for low power applications but are generally unacceptable for high power lasers. One reason is that electrical power to drive the laser is very limited and must be used efficiently. Another reason such losses are unacceptable relates to thermal management. A high power laser operating at 500 kW that loses 20% of the light before transmission would need to safely dispose of 100,000 W of laser power, which is a very significant power level.

Self-imaging in an optical tunnel is described by Bryngdahl in U.S. Pat. No. 3,832,029, but Bryngdahl does not describe requirements to use such devices for coherent beam combination. Similarly, U.S. Pat. No. 4,087,159 to Ulrich describes a number of self-imaging waveguide devices, but it does not teach a system that can be scaled to high power and that can coherently combine many beams into one higher power beam.

SUMMARY OF THE INVENTION

To address these and other problems, the disclosed invention uses waveguides to transform and/or coherently combine multiple laser beams into one. In one beam combination applications of the invention, several laser beams are injected into a tapered waveguide, reflect from the sides of the waveguide, and emerge as one beam. According to one aspect of the invention, the beam combining method and system uses adiabatically tapered waveguides, which is in contrast to prior combining techniques that use parallel waveguides or non-adiabatically tapered waveguides.

In another aspect of the invention, the self-imaging effect is not explicitly exploited. This has several important advantages, including, but not limited to:

The length of the waveguide is not subject to the same limitations on meeting specific height and length relationships as is the case with Talbot or fractional Talbot self-imaging in a straight waveguide, and it can be tuned to meet desired requirements.

The beams resulting from the coherent combination are generally nearly diffraction limited (i.e., low $M^2$) beams with a Gaussian or nearly Gaussian intensity profile. These output beams are produced even if the beams input to the tapered waveguide do not have a Gaussian spatial profile, which provides evidence that the exploited effect is not conventional self-imaging.

The output beam size is generally relatively insensitive to the beam size at the input.

Multiple input beams to be combined may be placed farther apart than is the case where strict imaging conditions must be satisfied. This has important practical implications since dimensions used in these types of beam combiners are frequently small and spreading beams apart greatly eases practical construction. A related benefit of increasing beam separation is that larger optics may be used, which is desirable in scaling systems to high power.

In another aspect of the invention, tapered waveguides and multiple input beams are used in conjunction with a closed-loop feedback system that controls the phase of the input beams in order to produce an output beam that is stable and has a desired intensity profile. This closed-loop phase control is highly desired, especially for systems operating in dynamic environments, including land vehicles, seacraft, aircraft, and spacecraft.

In another aspect of the invention, phase control of multiple input beams is used to synthesize output beam profiles meeting a priori established criteria. To perform such synthesis, numerical simulations are generally used to propagate a desired output profile back through the tapered waveguide to establish what beams should be input to produce the desired output.

More particularly, an apparatus is provided for transforming laser beams. The apparatus includes a waveguide including first and second elongate elements each having a reflective surface. The two waveguide elements are spaced apart with their reflective surfaces facing each other. The waveguide further includes an input or inlet at a first end of the waveguide elements and an output or outlet at a second end of the waveguide elements. The waveguide elements are positioned such that a distance between the elements at the inlet and at the outlet differs (e.g., the height of the waveguide defined by these distances differs at the inlet and outlet) such that the waveguide is tapered, i.e., the reflective surfaces are non-parallel. In some embodiments, the distance at the inlet is larger than at the outlet. The apparatus further includes a control or directing assembly that operates to direct a beam, which may be made up of a plurality of laser beams, having a first intensity profile into the waveguide inlet, and the waveguide transforms the beam such that the beam at the waveguide outlet has a second intensity profile that differs from the first intensity profile. In some embodiments, the lengths of the elongate waveguide elements are selected to be substantially equal and are selected such that the second intensity profile matches a predetermined intensity profile, such as a substantially Gaussian profile and/or such that the output beam is a single coherently combined laser beam.

The control or directing assembly may include an assembly for controlling the phase of input beams so as to lock at least a portion of the beams, and often, all of the beams, so as to control a quality criterion for the resulting combined laser beam. This quality criterion may be on-axis intensity, beam intensity uniformity, sidelobe suppression, and/or Strehl ratio. To this end, the control assembly may include phase adjusters for each of the input beams to individually/separately control beam phase and a beam diagnostic element that measures an intensity of the beam at the output of the waveguide relative to the desired quality criterion. A servo or other system may be used to respond to the measurements or feedback/control signals from the beam diagnostic element to perform phase locking or phase control such as by operation of the phase adjusters. The servo system may utilize multi-dithering techniques or in some cases, a neural network method may be employed by the servo system. Phase control may be performed using liquid crystal devices, electro-optic devices, electro-mechanical devices, and/or acousto-optic devices. In some embodiments, the inlet is larger than the outlet, i.e., the height (or distance between the two waveguide elements) is larger at the inlet than at the outlet. Also, in some cases, the waveguide may be two-dimensional (e.g., the input beams are provided in a two-dimensional manner). Further, the waveguide may be configured with an inlet and an outlet that are square in cross section and a taper angle of the first and second waveguide elements may be substantially equal.

According to one aspect of the invention, a beam combination system is provided for combining laser beams. The system includes a waveguide having an inlet and an outlet at opposite ends of two waveguide elements. These waveguide elements each have a reflective surface facing into the waveguide, and the reflective surfaces are non-parallel such that a height of the inlet is different than a height of the outlet. In some embodiments, the height of the inlet is greater than the height of the outlet. The system further includes a beam input assembly that is operable to control a phase of each of two or more laser beams input at the waveguide inlet, and typically, the phases of the beams are locked to a substantially single phase. The lengths of the two waveguide elements are selected to produce a coherently combined laser beam from the input laser beams at the waveguide outlet. The beam input assembly may include a laser beam source, a beam splitter for generating a number of lower power beams from the source beam, and a plurality of phase adjusters for controlling the phase of each of these lower power beams to generate the input beams for the waveguide. The phase adjusters may be operated by a servo system that functions in response to feedback or control signals from a device(s) used to measure the phases of the beams prior to entry into the waveguide and/or to measure an intensity profile (or other quality criterion) at the waveguide outlet.

BRIEF DESCRIPTION OF THE DRAWINGS

FIG. 3 shows examples of single laser beams propagating from input to the output of a tapered waveguide.

DETAILED DESCRIPTION OF THE PREFERRED EMBODIMENTS

Figure 1:
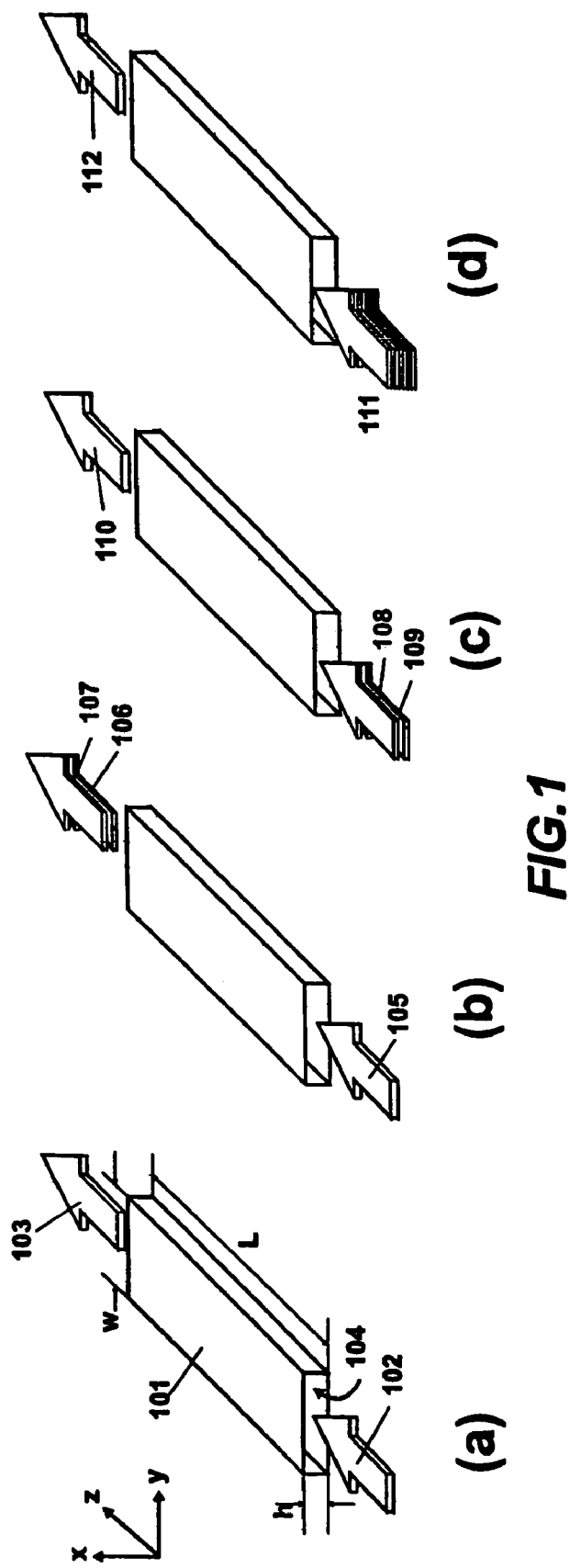
FIG. 1 shows the general geometry of a waveguide of the prior art.

Self-imaging waveguides: Prior to discussing the inventive tapered waveguide method and apparatus, it may be useful to discuss waveguides in general and self-imaging waveguides and their operation in particular. FIG. 1 shows a planar waveguide 101 used for beam splitting and combination. In a 1-dimensional (1D) geometry, the straight waveguide 101 is defined by three parameters: the length L along the z direction, the width w in the "unguided" y direction, and the height h in the "guided" x direction. The terms "unguided" and "guided" refer to the degree to which the presence of the waveguide affects propagation of an injected laser beam 102 as it propagates through the waveguide 101 and emerges as an output beam 103. A measure of whether the waveguide 101 affects the beam or not is to consider whether the diffracted beam size $\omega_1$, after an initial beam of size $\omega_0$ has propagated some distance into the waveguide, is greater than the half the height h. When $\omega_1 > h/2$, this condition is met and the beam 102 reflects off the sides of the waveguide 101 as it propagates along its length L. When $\omega_1 < h/2$, the condition is not met and the beam 102 may propagate unperturbed through the waveguide 101 as if the guiding structure were not present.

Two-dimensional guiding is discussed further below, but for the present planar (1D) waveguide discussion, it is assumed that the beam diffraction is slow in the unguided direction. One candidate type of laser used for high power beam combination is a waveguide laser as disclosed, for example but not as a limitation, in U.S. Pat. No. 6,894,828 to Pelouch et al., where the beam may be highly asymmetric in the x and y axes. As an example, in the x-direction the beam radius may be $\omega_{0x}$=0.05 mm while in the y-direction the beam radius may be $\omega_{0y}$=5 mm. From the above equation, the diffraction distance $z_0=\pi\omega_0^2/\lambda$ in the x-direction (assuming a wavelength of 1 micrometers) is calculated to be 7.8 mm and the diffraction distance in the y-direction is 78 m. For waveguide lengths up to several meters, it is an excellent approximation that the beam is unguided in the y direction, provided that the width y of the waveguide is large enough and positioned such that it does not physically interfere with the beam. In this unguided y-direction, the beam is not affected by the presence or absence of walls, and in such a case, the guiding is 1-dimensional and the waveguide may include only two reflecting surfaces. In the x-direction, on the other hand, it is clear that with the stated parameters waveguide lengths longer than several millimeters will be guiding the beam.

In low power applications, the waveguide 101 is in many cases fabricated from solid materials, such as a multilayer structure of a glass with a high refractive index that is sandwiched between two layers having a lower reflective index. In such a structure, the guiding mechanism in the interior 104 of waveguide 101 is total internal reflection. For high power applications, it is typically more desirable for the interior space 104 of the waveguide 101 to be hollow and either evacuated or filled with a suitable gas. In this hollow waveguide case, the waveguide walls may be made of, for example, metal with a highly polished interior surface. Other examples of structures would include glass or crystals having highly reflective coatings deposited on the interior surfaces of the waveguide 101.

Self-imaging is a phenomenon whereby an object light distribution present at the input to the waveguide 101 is reproduced after propagation through the waveguide 101. In other words, the waveguide 101 acts as an imaging system. As will be noted further below, fractional imaging is also possible where one input beam 105 is split into two output beams 106 and 107 as illustrated in FIG. 1(b). Reciprocity then means that inputting two beams 108 and 109 into the same waveguide as illustrated in FIG. 1(c) results in a single output beam 110. It is further the case that a larger number of beams 111, as illustrated in FIG. 1(d), can be coherently combined into a single output beam 112.

Figure 2:
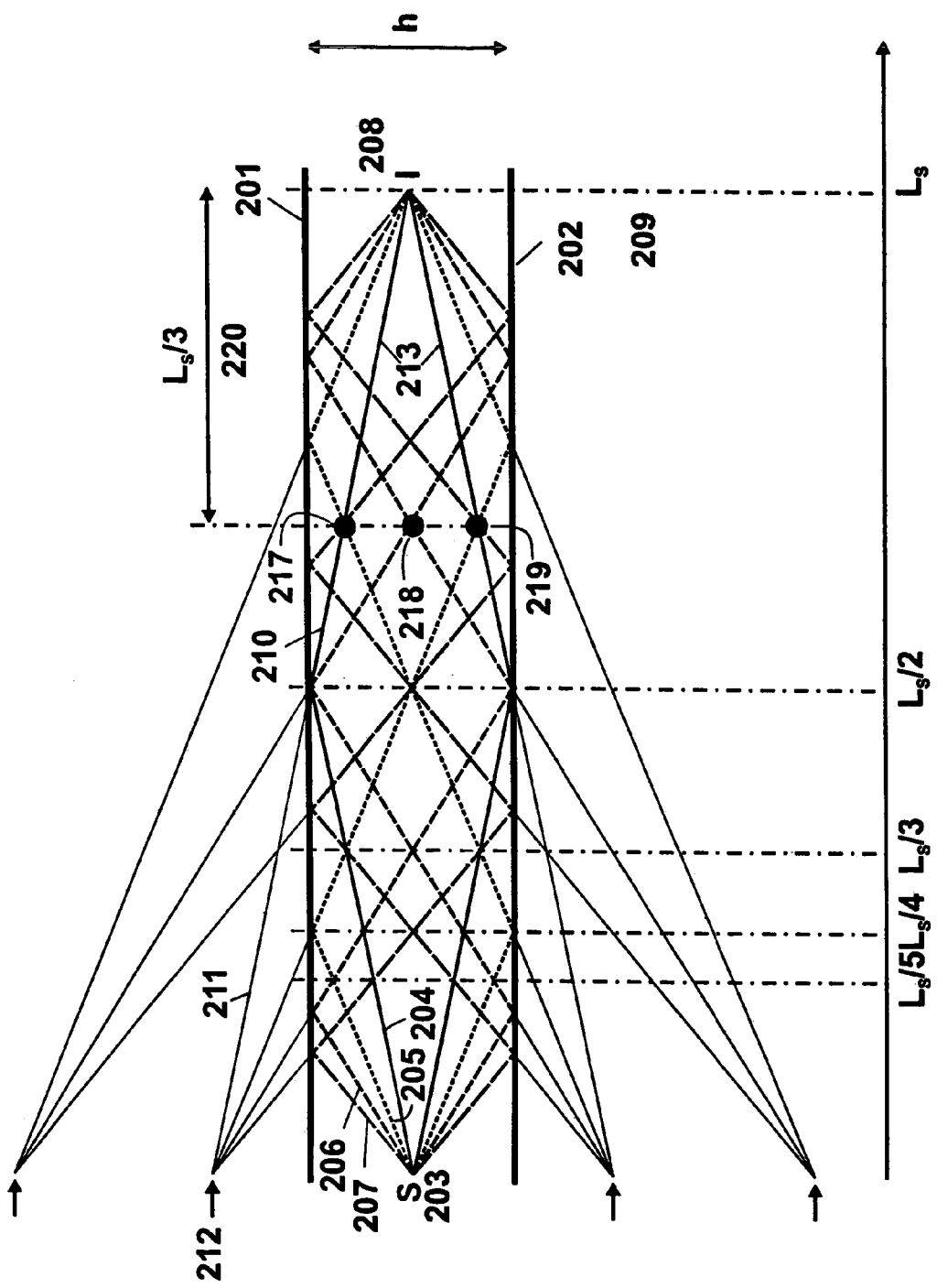
FIG. 2 shows the principle of image construction using self-imaging.

FIG. 2 illustrates the principle of self-imaging in a straight and parallel one-dimensional waveguide formed by reflecting surfaces 201 and 202. Light propagation in waveguides is most appropriately discussed in terms of eigenmodes of the waveguide, but to provide a simple understanding of the phenomenon, this discussion first adopts a ray tracing approach. In this approach, each guided eigenmode can be viewed as rays propagating in the waveguide at specific angles to the axis of the waveguide. Light input as a source S shown at 203 at the left side of the waveguide is decomposed into the permitted eigenmodes. The lowest order mode propagates as ray 204 while higher order modes propagate as rays 205-207. In general, many modes can propagate with only the first few are shown for clarity.

When a ray intersects the upper or lower waveguide surfaces 201, 202, it is reflected according to the well-known law of reflection. As a result, a point exists along the length of the guide at which the rays 213 corresponding to the lowest order mode (the "fundamental" mode) intersect at a point I also denoted by numeral 208. This occurs at the so-called Talbot length $L_S=4nh^2/\lambda$, where h is the height of the waveguide as illustrated, n is the refractive index within the guide (=1 and can be omitted for evacuated hollow waveguides), and $\lambda$ is the wavelength of light used. It is also known that within the validity of the paraxial approximation that rays from the other propagating modes converge to the same point 208. As a result, propagation over one (or a multiple of) Talbot length reimages the source distribution of light. Such images are frequently referred to as Talbot images, but it is noted that Talbot imaging is most frequently used, not with waveguides, but with diffraction gratings, pinhole arrays, and similar devices that create an array of virtual sources.

A useful way of looking at this phenomenon is to note that an observer at the imaging point 208 cannot tell exactly from where the rays originated. In fact, to such an observer, a ray 210 appears to originate from a point along the extended path 211. It is then possible to "unfold" the waveguide geometry in such a manner that all reflected rays are traced to their apparent origin. If this is done, one finds that light observed at 208 appears to arise from a whole set of virtual sources denoted by arrows in FIG. 2 and exemplified by 212. This virtual source picture is the basis for such things as the kaleidoscope and is well known in the art.

It is also the case that fractional Talbot images (also known as "Fresnel images") are formed at fractional Talbot lengths, that is, at distances $L_S/2$, $L_S/3$, . . . $L_S/N$, as illustrated in FIG. 2. In this case, it is found that a multiplicity of images is formed across the height of the waveguide. Thus, a single source S injected at the waveguide input can be used to split the beam into multiple replicas at appropriately chosen points. Since the propagation is reciprocal, it is equally possible, as disclosed in co-pending U.S. patent application Ser. No. 11/372,420 entitled "METHOD AND APPARATUS TO COHERENTLY COMBINE HIGH-POWER BEAMS IN SELF-IMAGING WAVEGUIDES" to Christensen et al., which is incorporated by reference herein in its entirety, to inject multiple beams and produce a coherently combined single output beam. An example would be to inject three beams at locations 217-219 in order to form a single beam at the output image position 208.

A limitation on the use of self-imaging for beam combination is that it is difficult to place multiple input beams in proximity. Practical waveguides under consideration are generally small as a result of the desire to minimize the Talbot length. For example, a hollow waveguide with a height h=0.2 mm and used at a wavelength $\lambda$=1 μm has a Talbot length $L_S$=160 mm. This means that combining even N=2 beams requires that each one occupies no more than 0.1 mm of space. Individual beams must be transported to the input plane, which becomes difficult when the beams are very small, and the problem is compounded as the number of beams increase.

With this description of self-imaging in mind, preferred embodiments of the present invention are next described in detail. The inventors have found that the above cited problems, e.g., the problem of using widely separated input beams, can be addressed through the use of tapered waveguides. A tapered waveguide is one where the waveguide height is not the same at the input end as at the output end. In the case of 1-dimensional guiding, the tapered waveguide may be made of two strips of reflective material positioned to provide an input end and an output end where the strip spacing is adjusted to predetermined values at the input and output. This results in the definition of the full taper angle as (input height−output height)/length. Further examples of tapered waveguides will be given below.

Depending on the purpose of the waveguide, the guide may be a "downtaper" where the input height is greater than the output height, or it may be an "uptaper" where the output height is greater than the input height. In many embodiments of the invention it is often the case that coherent beam combination is performed using downtaper waveguides and beam splitting is performed using uptaper waveguides.

Extensive simulations using diffraction codes performed by the inventors accurately predict the behavior of beams propagating in tapered waveguides and have demonstrated that output beams having very nearly Gaussian profiles may be created from a wide variety of input beams. This phenomenon has also been verified in experiments carried out by the inventors. In the case of a single input beam, a tapered waveguide may be used to transform an input light distribution into a substantially Gaussian output beam. In the case of multiple input beams, a tapered waveguide can be used to coherently combine the beams into a single, substantially Gaussian beam with low $M^2$, the latter being a well-known measure of beam quality. The $M^2$ quantity can be interpreted as the "times diffraction limited" divergence of a beam so that an $M^2$ value of 1.000 represents a perfect beam whose propagation is diffraction limited.

FIG. 3 illustrates the beam transforming properties of a tapered waveguide. The waveguide shown in FIG. 3(a) includes two reflective surfaces 301, 302. An input beam 303 is injected at the left side of the waveguide formed by surfaces 301, 302. In many of the simulations, an input beam was used having a Gaussian intensity distribution characterized by an $e^{-2}$ intensity half-width ("waist size") $\omega_0$. The gray scale patterns provide a visual view of the complex intensity patterns that develop along the length of the waveguide as the beam propagates from left to right (from input to waveguide output). Darker shades indicate a higher local light intensity. At the output of the waveguide, the light emerges as a beam 305 whose intensity profile can be plotted as shown by curve 306.

When the waveguide length and taper angle are designed correctly (or to have particular characteristics), the result of inputting a Gaussian beam 303 is an output beam 305 whose intensity profile is very nearly Gaussian and whose propagation factor $M^2$ is nearly 1, which indicates that the output beam is for practical purposes a diffraction-limited Gaussian beam. This is illustrated in FIG. 3(a) where a 573.7 mm long aluminum waveguide tapered from an input height of 3.0 mm down to an output height of approximately 0.20 mm was used with an input beam waist of $\omega_0=0.05$ mm. As illustrated by curve 306, showing a cross-sectional intensity profile of the output beam, the output beam 305 is nearly Gaussian with a waist size of $\omega_1=0.027$ mm and a calculated $M^2=1.08$.

It was also found that inputting beams with a wide range of waist sizes produces high quality Gaussian output beams. For example, FIG. 3(b) shows the results with $\omega_0=0.8$ mm, and FIG. 3(c) shows the results with $\omega_0=3$ mm. In both cases, the output beams are nearly diffraction limited, and the output beam sizes are not changed much despite the fact that the input beam size was varied by a factor of 3.0/0.05=60. In fact, for the last case, the input beam significantly overfills the input aperture so that effectively what is input is a top-hat intensity distribution limited by the waveguide input height of 3 mm. The main change in configuration required to produce a substantially diffraction limited output beam waist from varying size input beams is a slight change in the length of the waveguide where the waist occurs. In the example cases illustrated, the waveguide lengths are as noted in the respective figures.

Further calculations of this type permit one to plot a number of parametric relationships, examples of which are shown in FIGS. 3(d) and (e). FIG. 3(d) shows the variation of output beam size and optimal length of the waveguide as a function of input waist size. As the input waist is varied from $\omega_0=0.02$ mm to $\omega_0=6.0$ mm, it can be seen that the output waist goes from a small value, peaks for input waists near 1 mm, and then decreases again. The optimal length of the waveguide varies monotonically from small input waist size to large. FIG. 3(e) shows the variation of $M^2$ with input waist size. Although there is variation in $M^2$, it is noted that even in the "worst" case the $M^2$ is near 1.08, which is still an essentially perfect beam. It is also important to note that the production of a Gaussian output beam is not sensitively dependent on the intensity distribution at the input. This is demonstrated in part by the above noted fact that a wide, nearly uniform intensity input produces a Gaussian output. Further calculations and experiments have also shown that input beams having a super-Gaussian input profile also produce nearly Gaussian output beams. Super-Gaussian beams have an intensity profile of the form $\exp(-(x/\omega_0)^{2n})$, where n is an integer. The limiting case of a Gaussian beam corresponds to n=1, while a top-hat beam corresponds to the limit of n→∞.

Figure 4:
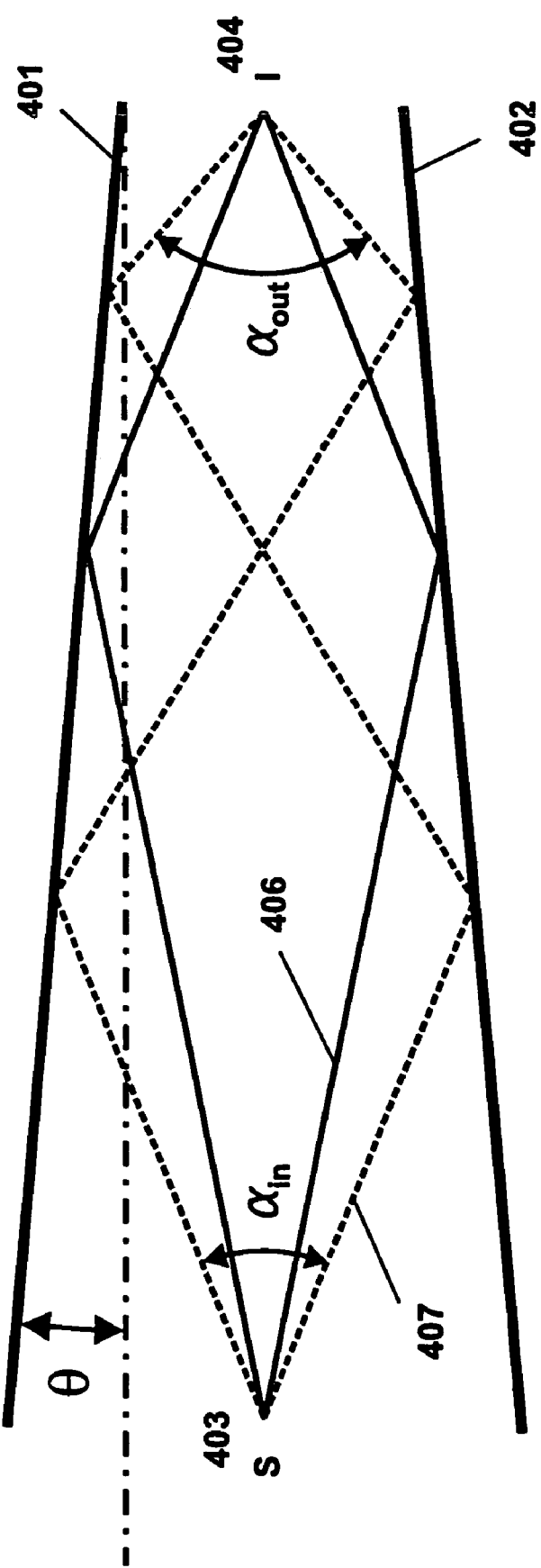
FIG. 4 shows the geometry of a 1-dimensional waveguide according to the invention unfolding of a tapered waveguide to create virtual sources.

The inventors believe that these results can be partly understood with reference to the spatial frequency transformation that occurs as a result of the waveguide taper. Spatial frequency refers to the decomposition of a beam into angular plane waves. A straight waveguide as illustrated previously in FIG. 2 does not alter the spatial frequency or angular content of an input beam. Rays reflecting from the waveguide walls experience no change in propagation angle to the waveguide axis, except for a change in sign. The situation is different in a tapered waveguide, such as the one illustrated in FIG. 4 that is composed of two non-parallel reflective sides 401 and 402. As shown, a source S 403 is located at the input end. Rays 406 and 407 propagate from the source 403 and reflect from the sides 401 and 402. However, because of the taper angle θ of the waveguide, each reflection increases the ray angle with respect to the horizontal axis. As a result, repeated reflections produce an increasing angular distribution (spatial frequency content) of light. The result is that the angular extent $\alpha_{out}$ of the beam downstream from the input is greater than the angular extent $\alpha_{in}$ present at the input. It is also evident that rays starting out with a small angle relative to the horizontal generally experience fewer reflections than do rays that start out at a large angle from the source. However, if the source has a large transverse extent, then forward propagating rays emanating close to the waveguide boundary walls will reflect from the walls after a short propagation distance. As a result, such rays also experience a relatively large number of reflections and may, as a result, undergo a significant change in angle after a number of reflections.

The diffraction angle (spatial frequency content) of a laser beam having a beam diameter D is inversely proportional to the beam diameter. In the case of a Gaussian beam propagating through free space, the relationship between diffraction angle θ and mode size ω is $\omega=\lambda/\pi\theta$. From this expression, it is clear that generation of a small mode size requires large diffraction angles. It then appears reasonable to qualitatively interpret the behavior of the tapered waveguide as follows: In all cases, it is possible to tune the length of the waveguide and the taper angle in such a manner that the rays, or more appropriately the eigenmodes, rephrase at a specific length to produce a single lobed beam. The size of the output beam is dependent on the spatial frequency content of the input beam as well as the input mode size $\omega_0$. If the input waist is relatively small, the beam will diffract quickly and will acquire high spatial frequency content through repeated reflections from the wall. This corresponds to the case shown previously in FIG. 3(a). If the input beam is very large, then portions of the beam will again experience repeated reflections from the wall as it propagates. Therefore, even if its spatial frequency content was low at the input, it can be very high at the output leading to a small beam size. The intermediate input mode size case shown in FIG. 3(b), however, is different. In this case, the beam may propagate a significant distance through the waveguide without experiencing any reflections. The additional spatial frequency content added to the beam in propagation may therefore be low, resulting in a relatively larger output beam size.

It is also reasonable to speculate that the observed variation of $M^2$ with input mode size makes qualitative sense. The higher spatial frequency content required to produce a smaller beam also increases the number of waveguide modes that are excited. This means that more phases must be correct in order to produce a single small output beam. Thus, one might anticipate that the $M^2$ may degrade somewhat as the output mode size is reduced, due to slight mismatches in the propagation phases of the eigenmodes. Similarly, where along a waveguide the phases come together to produce a single lobed beam will be dependent on the spatial frequency content of the beam, which manifests itself as a shift ("defocus") of the waveguide length required to produce the lowest M2 output beam.

Extensive computations and simulations performed by the inventors indicate that the tapered waveguide can be used to transform a wide variety of input intensity distributions into substantially Gaussian output beams, and, further, that the output mode size is only a relatively weak function of the input beam size. Based on these simulations, it is believed that the phase distribution at the input to the waveguide is a stronger determinant of the output beam behavior than is the amplitude distribution. This will be further illustrated below. The specific parameter values used with FIG. 3 should also be considered as an example only. Computations indicate that it is possible to design tapered waveguides with other parameter sets. What is generally the case is that the waveguides are tapered at a small angle, such as in the range of 0.1-10 mrad, resulting in practical cases in a ratio of input height/length<<1.

Figure 5:
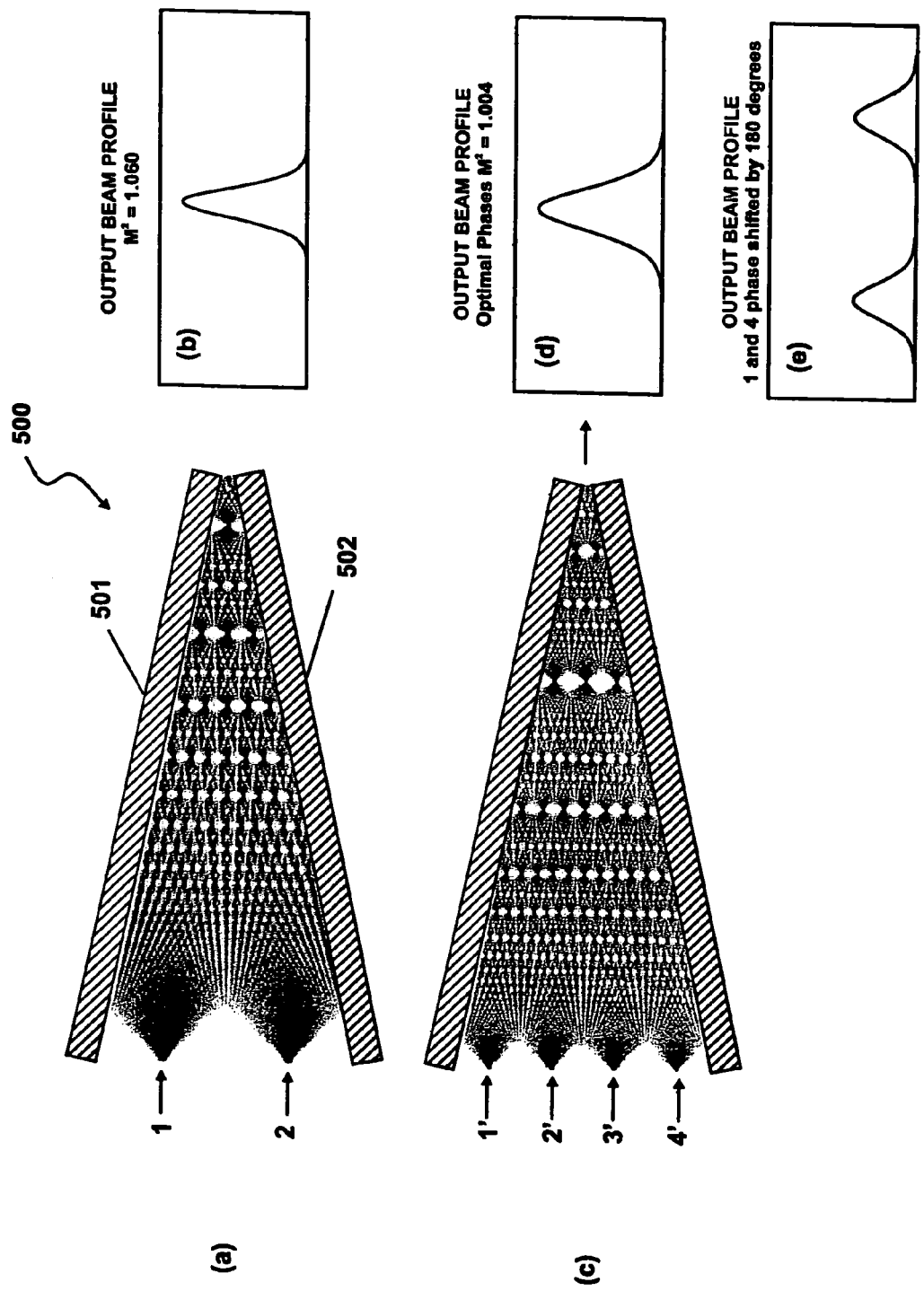
FIG. 5 shows examples of coherent beam combination using tapered waveguides according to the invention.

As noted above, it is desirable to use the tapered waveguides of the invention to coherently combine multiple input beams. From the above discussion, it is evident that this should be possible since one large input beam can be considered to be composed of multiple smaller beams. Extensive calculations have shown that this is a correct conclusion and that tapered waveguides may be advantageously used to coherently combine multiple input beams. FIG. 5 illustrates two examples of using 2 and 4 input beams. In FIG. 5(a), two input beams labeled 1 and 2 both having waist sizes $\omega_0$=0.050 mm are input to the waveguide assembly 500 comprising reflective members 501 and 502. In this case, the input height was 1724 μm, the output height was 110 μm, and the waveguide length was 287 mm. The output beam profile is shown in FIG. 5(b) and indicates that the two input beams have coherently combined into a single beam with a substantially Gaussian intensity profile having a waist $\omega_1$=32 μm and $M^2$=1.06. Similarly, FIG. 5(c) shows the result achievable with four $\omega_0$=0.050 mm input beams labeled 1'-4' input to a tapered waveguide assembly. The output intensity profile shown in FIG. 5(d) is again a substantially Gaussian beam with a waist $\omega_1$=46 μm and $M^2$=1.004. In this case, the input height was 3448 μm, the output height was 200 μm, and the length was 523 mm.

It is noted that the waveguide parameters (length and taper angle) generally need to be optimized numerically in order to produce these results. This is particularly true as subtle effects, including phase shifts in dielectric media and the complex nature of the refractive index in metals, are very difficult to account for properly using analytical methods.

It was pointed out above that the beam phase across the input to the waveguide has an important influence on the output. This can be seen in the case of four input beams as in FIG. 5(c). In order to produce the nearly Gaussian output beam in FIG. 5(d), the phases of the outer input beams 1' and 4' in FIG. 5(c) were adjusted relative to the phases of the inner beams 2' and 3' in order to optimize the output beam to the shape shown in FIG. 5(d). In the illustrated case, this occurred for a phase shift of approximately 6 degrees. To illustrate the importance of phase control, the outer beams were then phase shifted by an additional 180 degrees relative to the inner beams. This produced the double-peaked output shown in FIG. 5(e), which is clearly not a single Gaussian beam. Under such dephased circumstances, it may be possible to locate a single lobed output at some other location (different waveguide length) or recreate a single lobe with a change in taper angle. However, it is generally the case that practical waveguides have a fixed construction, and consequently, it is frequently better to adjust phases rather than to alter the waveguide configuration. This is especially important since the relative phases are very likely to vary with time, in particular if the input beams are derived from different sources.

While a primary objective is frequently to produce a Gaussian output beam from a system, the calculations indicate that appropriate selection of input amplitude and phase distribution can produce a wide variety of output beams, i.e. multiple input beams can be used to synthesize a desired output beam. While it is possible to find a desired output beam by varying parameters at the input plane, it is frequently more advantageous to instead start at the output with the desired output beam and to propagate that back through the waveguide. This will determine what light distribution needs to be input in order to produce the desired output.

At this point, it is also important to note that the behavior described herein is fundamentally different from the behavior obtained using self-imaging as discussed above. Self-imaging reproduces one intensity distribution at another plane in a waveguide. Fractional self-imaging (or fractional Talbot imaging) enables reproduction of multiple "copies" of an intensity distribution across the width of a waveguide. However, conventional self-imaging obeys anticipated image magnification laws. For example, if a beam of width D is split using fractional Talbot imaging in a non-tapered waveguide into 3 copies, then each copy has a size D/3. Similarly, if 3 input beams are conventionally combined into one, then the output beam would in this exemplary case be three times larger. It is then evident from the above description that the tapered waveguides do not obey the same image magnification laws, since it has been demonstrated that a very large change in input mode size has relatively little impact on the output mode size.

A significant implication from the inventors' work is that input beams of a given waist size can be separated by much greater transverse distance and still produce a given output waist size than is possible with conventional self-imaging wave guides. This is particularly important in practice because it does not force a beam combination design to place the input beams extremely close, which may be difficult to implement.

Phase Locking: The preceding disclosure illustrates the principles of operation of a beam combiner according to the invention. However, simply inputting beams into a waveguide is insufficient for the beams to coherently combine as one beam. In addition to inputting beams at proper positions and pointing angles having substantially the same intensity profile, it is also desirable that the beams have the same polarization and are locked together with the proper phase relationship. It is generally straightforward to ensure that a multiplicity of beams have the same polarization state. Ensuring that they are phase-locked is, however, far from trivial, particularly as the number of beams increases, but such phase-locking is an important aspect of the invention.

An optical beam propagates in free space with an electric field of the form $E(t)=E_0 \sin(kz-\omega t)$, where $E_0$ is the absolute value of the field strength, $k=2\pi/\lambda$ and $\omega=2\pi c/\lambda$ is the angular frequency of the light (c=speed of light). It is well known that interfering two light beams of equal field strength produces an interference signal of the form $1+\cos(\Delta\phi)$, where $\Delta\phi$ is the phase difference between the beams. Beam combination with high efficiency is more effective when unintentional phase differences ("phase errors") between the beams are minimized or reduced. If this is not effectively achieved, the addition of N beams with random phases produces a combined beam on average having an intensity proportional to $\sqrt{N}I_0$, where $I_0=|E_0|^2$ is the intensity of a single beam. Coherent combination refers to beam combination where phase errors are minimized, in which case the total combined intensity scales with the number of beams as $NI_0$. For small numbers of beams, the difference may not be a significant concern; however, for large numbers of beams N, the difference has significant implications on efficiency of the system in delivering maximum intensity at a target. Given the above expression for $E(t)$, it is evident that spatial propagation differences $\Delta z$ much smaller than one wavelength (for example, <<1 micron) are sufficient to produce significant phase errors and consequently, loss of combination efficiency. This follows from the phase error $\Delta\phi$ being given by $\Delta\phi=k\Delta z=2\pi\Delta z/\lambda$.

FIG. 6(a) illustrates a beam combination system 600 which incorporates phase error sensing according to the invention. In the figure, a master oscillator laser 601 is used to provide a stable phase reference laser beam 602. Laser beam 602 is coupled into beam combiner 600 where a series of partially reflecting mirrors 603-604 and a fully reflecting mirror 605 splits the power in beam 602 into generally N beams 606-608 of lower power. Generally, the mirrors 603-605 are designed such that beams 606-608 have approximately the same power. Each of the split beams is next coupled into an amplifier subsystem. For example, beam 606 is coupled into amplifier subsystem 610. Each amplifier subsystem comprises a number of parts, the most important ones being a phase adjuster 611 and an optical amplifier 613. The subsystem 610 also contains a pump source 634 for the amplifier 613, and it may also incorporate lenses or other optical elements 635 and 636 to efficiently couple light into and out of the amplifier 613. Input beam 606 is coupled through phase adjuster 611 as beam 612, through optic 635, and into amplifier 613. The amplifier 613 increases the power of the optical beam 612 and outputs an amplified beam 614 after transmission through optional optic 636.

For clarity only, the details of one amplifier subsystem 610 is shown, but it is to be understood that such a subsystem exists for all beams 606-608. As a result, N amplified beams are produced that emerge as beams 618-620 which are coupled into a waveguide assembly 622 comprising 624 and 625. The waveguide assembly 622 is designed and arranged such that a single coherently combined beam 626 emerges at the output end when the phases between the input beams have the proper relationship. The purpose of phase measurements and phase adjustments is to ensure that the relative phases of the input beams 618-620 are such that this coherent combination takes place resulting in a substantially single-lobed beam 626 emerging at the output from the waveguide beam combiner. This is preferably accomplished by monitoring an aspect of the output beam 626 transverse intensity profile and adjusting the phases of the input beams to produce a beam profile that meets a pre-determined criterion. Such a criterion may vary from one application to the next and may, as examples, include one or more of the following:

Minimizing output beam $M^2$

Minimizing sidelobe intensity

Minimizing transverse intensity variations

Maximizing on-axis beam intensity

Maximizing beam Strehl ratio

Monitoring the output beam profile may be accomplished in a number of different ways, including monitoring light scatter from downstream optical elements, or through the insertion of a beam sampler into the output beam. This beam sampler may in moderate power cases comprise an optical element, such as a partly reflecting optical surface. It may also advantageously include a very fine wire of high thermal conductivity material, such as tungsten. When a beam sampler is inserted into the beam, it is preferably done some distance away from the end of the waveguide so that the beam footprint is greater than at the waveguide output and hence the intensity incident on the sampler, such as a wire, is below damage limits. As an example, in a very high power case, it may be useful to place a wire with a diameter on the order of 25 micrometers into the beam at a point where the beam width is 25 cm. In such a case, the fraction of power incident on the wire is only approximately 0.01%. If the laser is operating at an output power of 100 kW, the power incident on the wire is 10 W. Since the wire would be designed to scatter, rather than absorb, incident power, the amount of power absorbed in the wire can be made relatively small, such as less than 1 W.

We assume for the present discussion that a wire 642 is present in the beam. The long dimension of the wire is into the paper. For clarity in illustration, the wire is shown as a large dot, but it is normally the case that the wire diameter is substantially smaller than the transverse extent of the beam. The wire will generally scatter light 645 over a wide range of angles and a detector 643 is set up to detect some of this scattered light. In the example used here, it is assumed that the wire is placed in the middle of the output beam so that the detected light intensity is proportional to the beam intensity at the center. Light 645 scattered from the wire is then detected with detector 643 and an electrical signal 629, indicating the detected light intensity, is transferred to multi-dither servo 630. In this case, the beam combination criterion is typically maximizing the on-axis intensity and the purpose of multi-dither servo 630 is to alter the phases of beams 618-620 such that the mean signal on line 629 is maximized.

In the case of multiple (N) beams, an equal number N phases are adjusted. In practice, generally one phase is left to "float" as a reference and the other (N−1) phases are adjusted relative to this reference. A number of methods can be used to perform this co-phasing operation. One method that is essentially a neural network solution is to adjust each phase in turn and see whether phase alterations increase or decrease the detected intensity. This approach is often slow. In addition, if the detected intensity begins to decrease as a result of de-phasing one cannot tell which beam is causing the problem until the beams are individually tested. A preferred method of the invention is to use a multi-dither servo in which encoding of signals is used to separate individual phase error contributions. To implement this method, the phase of one beam may again be left to float as a reference, while the others are adjusted to that reference phase value. In order to separate the channels, each control signal 631-633 from servo 630 is composed of two parts. One is the slow ("DC") control signal that varies the mean phase. The second part is a small fast dither at a specific frequency unique to each beam. The amount of dither is generally small, such that the magnitude of the dithered phase is $<<2\pi$. By dithering the phase of individual beams at frequencies unique to each beam, the optical signal 645 and hence also the electrical signal 629 will contain amplitude variations at the multiple dither frequencies.

Since the frequencies for all channels are unique, the contributions can be separated electronically in servo 630, and the amplitude at each frequency determined. By altering the DC part of the control signal, the amplitude modulation for each beam can be driven to a predetermined state corresponding to maximum on-axis beam intensity. This process is carried out in parallel on all channels resulting in phase-locking of all beams at the input to waveguide assembly 622. Several algorithms can be used to perform the locking, including those that dither individual phases sequentially and others that dither all phases simultaneously. An example of the former would be a system where the phases are first adjusted in pairs followed by co-phasing of all pairs. One reason why simultaneous dithering of all phases may be desired is to note that the problem here is similar to other problems involving multi-parameter optimization. It is well-known, for example in the design of optics, that steepest ascent or hill-climbing methods may get trapped at local maxima in searching for a global maximum. This may be avoided through the use of stochastic techniques that randomly step the global maximum search routine over a large portion of parameter space. Hybrid methods that combine random stepping with local hill-climbing may also be used.

The phase shifters, exemplified by 611 and 637, may be any type of device that can produce an optical phase shift in response to an electrical signal. Suitable devices include liquid crystal phase modulators, electro-optic phase modulators, and acousto-optic phase modulators. The master oscillator 601 and amplifiers, exemplified by 613, may be any suitable devices at any radiation wavelength. Of particular interest are Nd and Yb based systems operating near 1 µm because of the relative ease with which high powers can be generated at high efficiency. Another specific wavelength range of high interest is 1.4-1.7 µm because of the availability of efficient and reduced eye-hazard lasers based on erbium (Er). The master oscillator 601 may advantageously be a rod laser, a fiber laser, a waveguide laser, or any other laser with suitable characteristics operating with a single frequency at a power level, for example, in the range of 0.1-100 W. As an example, in experiments carried out by the inventors the laser was a single-frequency NPRO laser purchased from Lightwave Electronics. The amplifiers 613 may be fiber amplifiers, waveguide amplifiers, or conventional bulk amplifiers and may be designed so that each outputs beams at a power level of $P_a$=0.5-10 kW or significantly more. If there are N beams in the assembly 600, the output power in beam 626 would consequently be $NP_a$.

The general architecture illustrated in FIG. 6(a) can be used in situations where the beam quality metric is different than on-axis intensity. As just one example of an alternative method we illustrate in inset FIG. 6(b) a case where a sampling optic 670, which may be a flat piece of glass, is used to pick off a very small portion of the power in output beam 626. The picked off sample is directed to a set of three detectors collectively labeled 660. The size and spacing of the detectors is selected such that the central detector primarily receives power in the part of the beam corresponding to the central desired lobe, represented by line 672. The two outer detectors "look at" sidelobes represented by lines 673 and 674. Detected signals proportional to the amount of power in the central lobe and sidelobes may then be transmitted as signals 662 to the multi-dither servo 661. As before, the role of multi-dither servo 661 is to output control signals 631-633 to the phase shifters in each of the channels. Thus, the control outputs are essentially the same in this case as in the wire scattering case noted above. A difference is the method of measuring the quality of the beam and converting that beam quality information into control signals 631-633. Given that the disclosed method can be used with 3 detectors (two may also be used, e.g., if one looks at the main lobe and the other at one sidelobe), the method may be generalized to any number of detectors, such as replacing detectors 660 with an array containing many pixels, for example 256 or 512 or more. In this case, a great deal of detailed information about the beam intensity profile can be readily obtained, as may be useful both to phase lock the beams using various criteria and also to evaluate the beam quality from a diagnostics perspective. It is, of course, also possible to use only one detector to look at the on-axis beam intensity when an optic is inserted to pick off a sample beam rather than using a wire as described above. In a further variation that can advantageously be used, the wire may be oriented in the plane of the paper and near the center of the laser beam. With such orientation, the laser beam intensity profile may be imaged using conventional optics onto a detector array. Since the wire samples the transverse laser beam intensity distribution, this method may advantageously be used with several of the criteria noted above.

Figure 7:
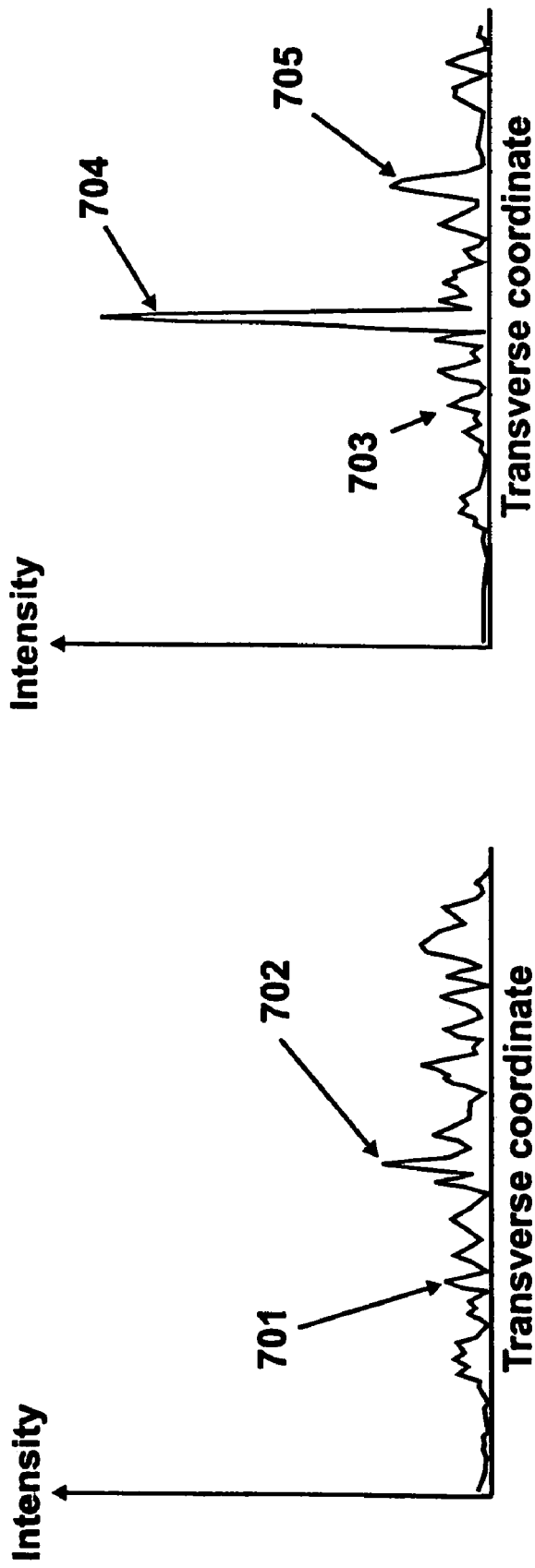
FIG. 7 shows experimental result demonstrating the effects of good phase control when combining beams according to the invention.

This method was used in an experiment carried out by the inventors to demonstrate important aspects of the invention. In a 4-beam combination experiments, a tapered aluminum waveguide having substantially the dimensions noted above was used to demonstrate coherent combination and phase locking of 4 input beams. In the experiments, the phase was adjusted with mirror positioning, acousto-optic modulators, and/or dither frequencies applied with electro-optic modulators. The output beam was intercepted by a camera that could display the intensity profile of the output beam. FIG. 7 illustrates typical results. If the input beam phases are allowed to drift uncontrollably, the output intensity profile of the beam is shown as curve 701 in FIG. 7(a). There is very little indication of single-beam structure in this profile. The center 702 of the distribution has a peak that is not much stronger than the rest of the profile. When the phases were adjusted to maximize center intensity, the situation changed drastically as illustrated by curve 703 in FIG. 7(b). In this case, the center beam intensity is many times greater than the background. This demonstrated to the inventors that it is possible, using the methods disclosed herein, to coherently combine multiple input beams into one output beam. It is noted that there is some evidence left of sidelobes, such as peak 705. This is believed to result from misalignment errors in the testing apparatus.

Figure 6:
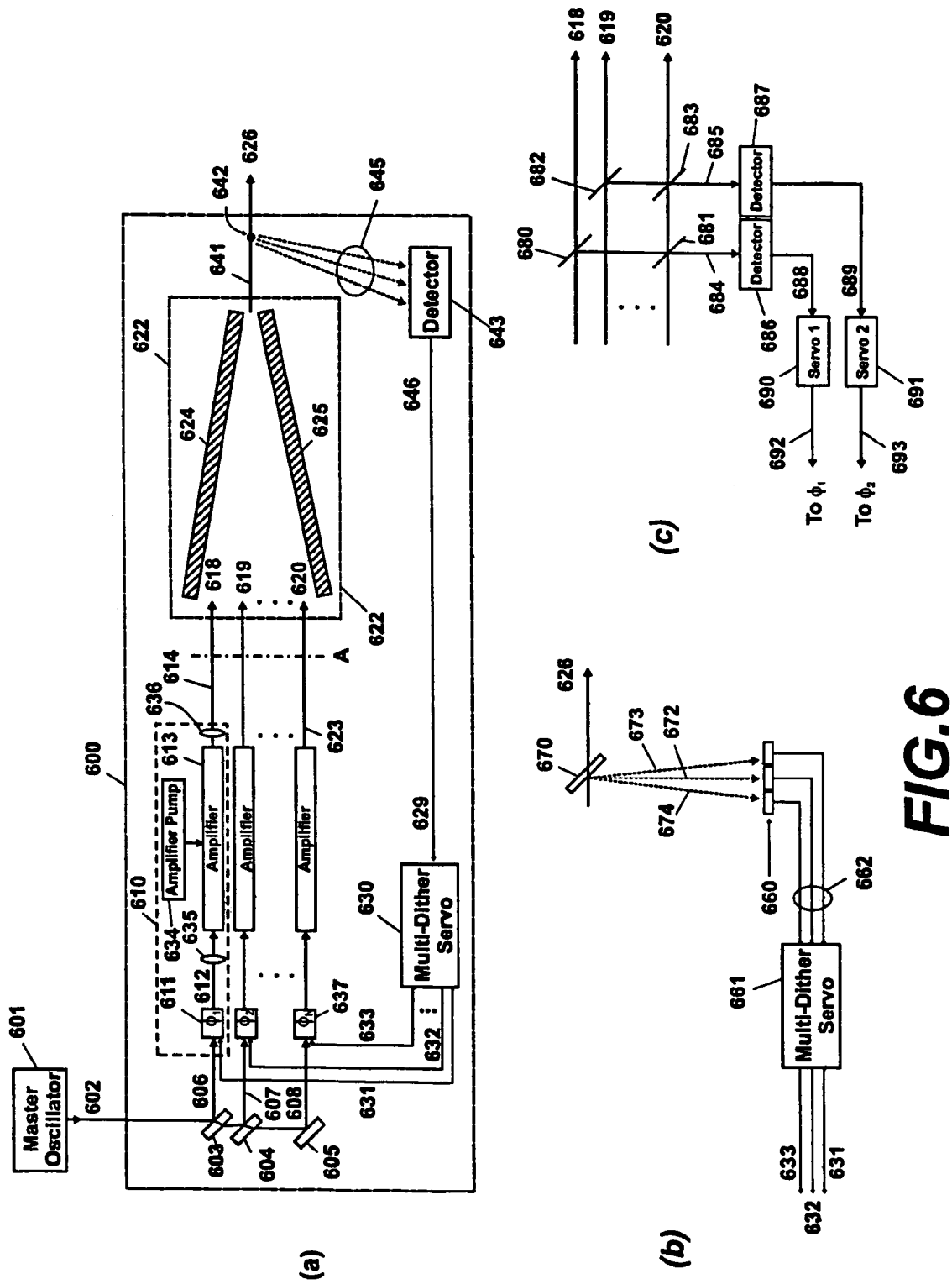
FIG. 6 shows a coherent beam combination system incorporating phase control.

The phase locking method described above may be referred to as operating in the far field after the combination is performed. It is also possible to combine beams in the "near field" prior to combination, for example at a plane indicated by line A in FIG. 6(*a*). FIG. 6(*c*) illustrates one method that may be implemented. One of the beams going into the beam combiner is designated as the reference, in FIG. 6(*c*) this is beam 620. For each of the other beams 618-619, beam samplers (for example, weakly reflecting mirrors) 680 and 682 are used to divert samples of the beams 618 and 619. Beam samplers 681 and 683 are used to pick off samples of beam 620 in such a manner that beam 684 comprises the coherent addition of a sample of beam 618 picked off with sampler 680 and the sample picked off beam 620 with beam sampler 681. Similarly, beam 685 comprises the coherent addition of a sample of beam 619 picked off with sampler 682 and the sample picked off beam 620 with beam sampler 683. Beams 684 and 685 can now be separately detected using detectors 686 and 687 and the detected electrical signals 688 and 689 sent to two separate servos 690 and 691 that independently output control signals 692 and 693 to the phase control elements. An advantage of this approach is that by separately mixing each beam with the reference beam it is not necessary to use multi-dither techniques to know the relative phase between any one beam and the reference.

Figure 8:
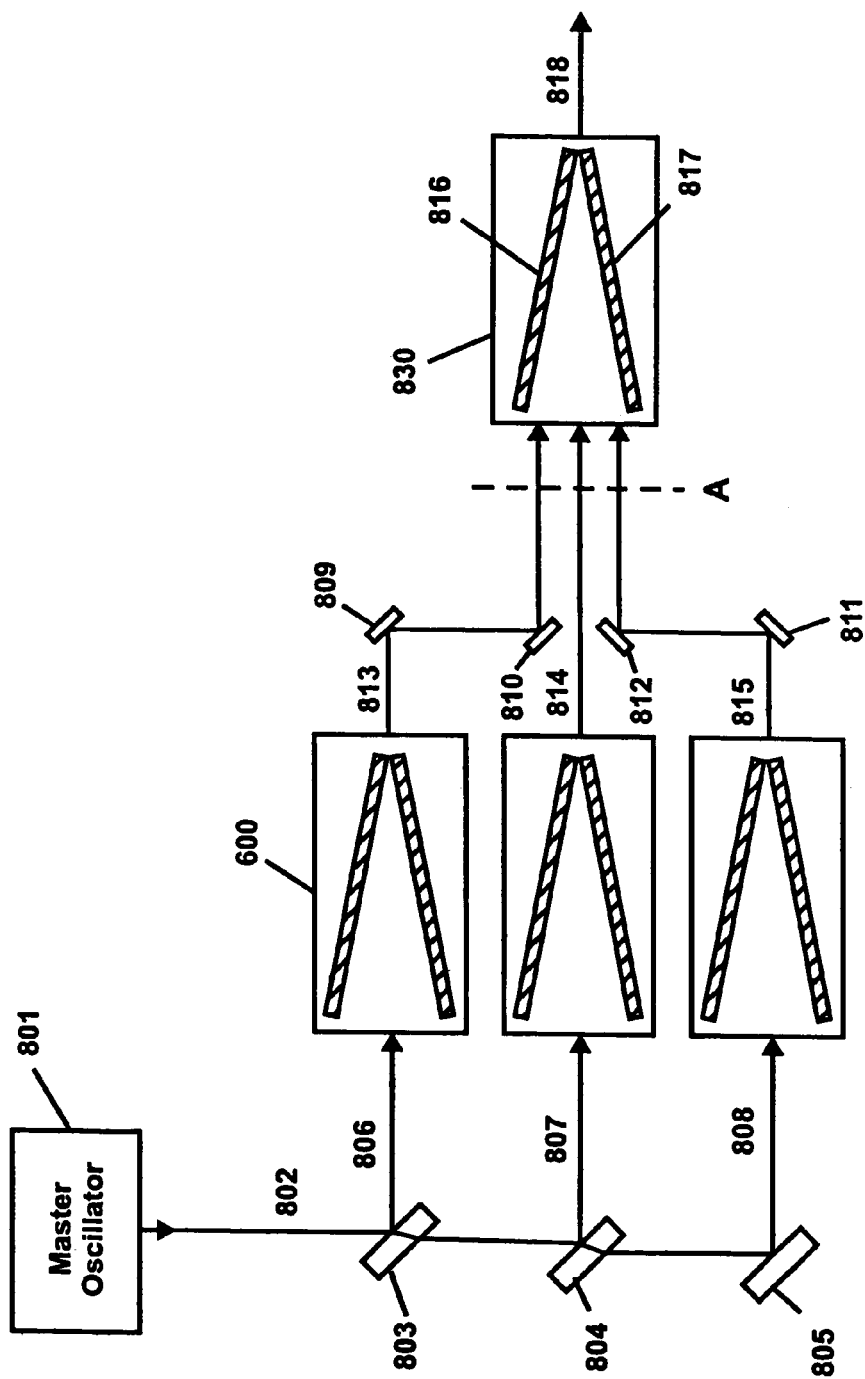
FIG. 8 shows a cascaded arrangement of coherent beam combiners.

The beam combination system as described above can in principle be used to combine any number N of beams. In practice, it may be necessary to limit the number of beams to a number N in the range of, for example, 5-15. In order to scale to higher power levels, it is possible to cascade multiple beam combiners of the invention. FIG. 8 illustrates an architecture for a 2-stage design. In FIG. 8, a master oscillator 801 again outputs a single-frequency beam 802 which, using partial reflectors 803-805, is used to divide power into multiple beams 806-808. Each of these beams is then input to a beam combiner 600 assembly as described above creating several amplified output beams 813-815. The output beams 813-815 from beam combiners 600 are then directed (for example with the use of optics 809-812) into a second stage beam combiner 830 including reflectors 816 and 817 to produce a single output beam 818. Although three beam combiners 800 are shown in FIG. 8, a smaller or larger number is clearly also possible. Phase locking of beams 813-815 for proper combination in the second stage beam combiner formed by reflectors 816, 817 may be done in a similar manner to what was described with respect to FIG. 6 but has been omitted from FIG. 8 for clarity. Several variations to phase locking cascaded beam combiners are possible. For example, it is possible to treat each beam combiner 600 as a separate phase locked system incorporating its own sensor and servo system. The outputs 813-815 are consequently providing high quality beams to the second stage beam combiner, but there may be no fixed phase relationship between the three beams. In such a case, the second stage beam combiner would incorporate a separate sensor (looking at output beam 919 but not shown for clarity), servo system, and phase adjusters to phase lock beams 813-815 into one beam 818. In such a case, the phase adjusters would be inserted for example at plane A before the second stage beam combiner input end. Another variation is to use one beam sampler at the output beam 818, a servo, and phase adjusters in each of the beam combiners 600. In this variation, beams present are individually adjusted for phase, as opposed to adjusting each stage sequentially. Based on this cascading principle, it will also be clear to those skilled in the art that additional stages may be added as desired, enabling scaling to very high powers. If each stage combines N beams and there are M stages, the total number of combined beams equals $N^M$.

Figure 9:
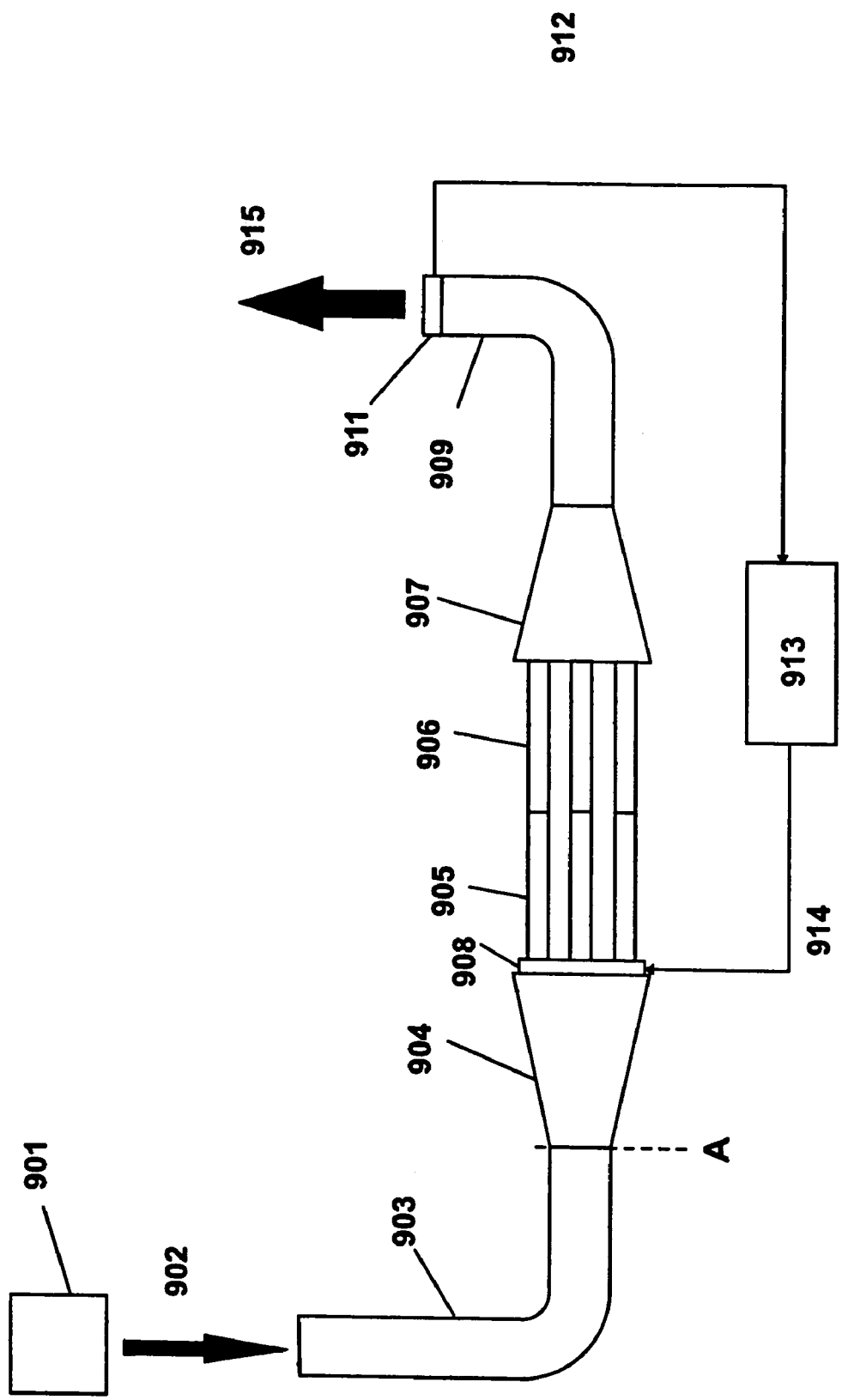
FIG. 9 shows the use of wave guiding devices to transport, split, and combine beams coherently.

It is evident that the invention provides for a method to combine many beams into a single beam of very high power. Because of the high power levels involved, it is sometimes undesirable to insert optics (particularly coated optics that may be susceptible to damage) into the combined beam. In general, however, a beam generated at one location still needs to be transported to another location. Hollow waveguides may serve this purpose very well, since it has been demonstrated that not only straight, but also curved, hollow waveguides may be used to transport light between physically separate locations. Such transport may be implemented by, for example, close-coupling a beam combination waveguide to transport waveguides. Combining transport waveguides and active elements (lasers and amplifiers) with the elements of the present invention therefore permits the possibility of constructing high power laser systems largely or entirely from waveguide components. FIG. 9 illustrates an example of a complete generation, amplification, and delivery architecture according to the invention. In FIG. 9, a master oscillator 901 produces frequency stable light beam 902 that is injected into a transport waveguide 903 that may be straight or may be curved as illustrated to transport light from one location to another. The transport waveguide 903 may be designed to produce several beams, such as three beams, at the output plane marked A in FIG. 9 so that the three beams may be coupled into a waveguide structure 904 that separates the three beams into three separate channels. This waveguides structure 904 may be a 1:3 self-imaging device or it may include a 3:1 waveguide device of the present invention operated in reverse to produce 3 beams from one input beam. This structure 904 may be followed by further transport sections 905 and coupled into amplifier sections 906.

Following the amplifiers 906, the separate beams are coupled into beam combination section 907, combines the three beams into one beam. The beam combiner 907 may be followed by additional transport sections 909 to route the laser emission to a desired location. The transport section 909 is followed by a detection system 911 that feeds signals 912 to servo 913 that adjusts the phase adjuster 908 using a signal 914, such that the output beam 915 from the system has the desired transverse profile. Many variations on this example are possible as the example is included to illustrate the general use of elements that may be combined to produce the desired phase-locked high power output starting with a low power master oscillator beam.

Figure 10:
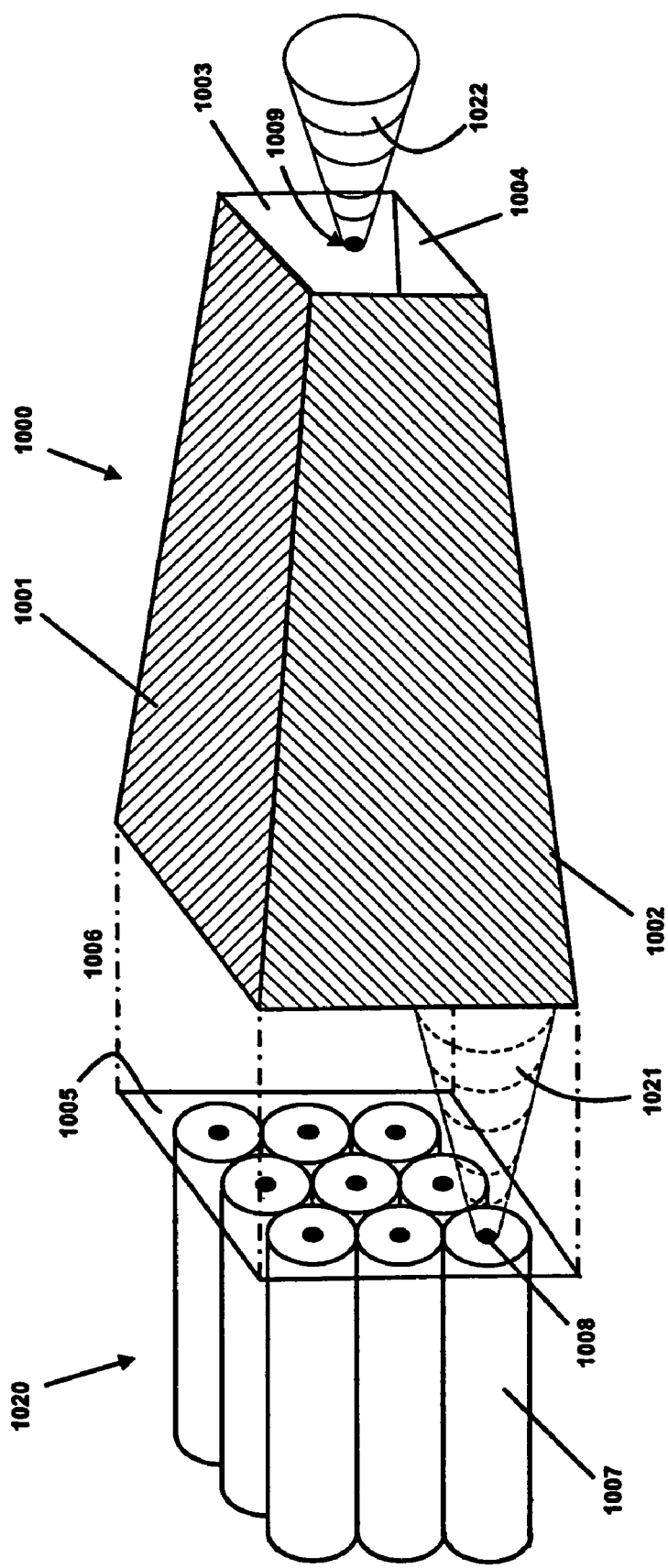
FIG. 10 shows an implementation of the disclosed invention where a 2-dimensional array of sources is combined into one output beam.

The concepts disclosed here are not limited to beam combination of a linear (one-dimensional) array of laser beams and can also be extended to two dimensions (2D). An exemplary configuration is illustrated in FIG. 10. In the simplest 2D case, a tapered waveguide 1000 having a substantially square cross-section is constructed from top 1001, bottom 1004, and two sides 1002 and 1003. Beams to be combined are input at the input face 1005, which is shown projected away from the waveguide 1000 by projection lines 1006 for clarity. In the illustrated case, nine optical fibers 1020 arranged in a square geometry are placed at the input plane 1005. Each individual fiber, exemplified by 1007, delivers laser power through a core 1008. The light from core 1008 enters the waveguide 1000 as a cone of light 1021. When the length of the waveguide 1000 is chosen appropriately through numerical analysis, a single beam 1009 will be formed at the output from the waveguide 1000 and radiates a single cone of light 1022 from the output end of the waveguide 1000.

Figure 11:
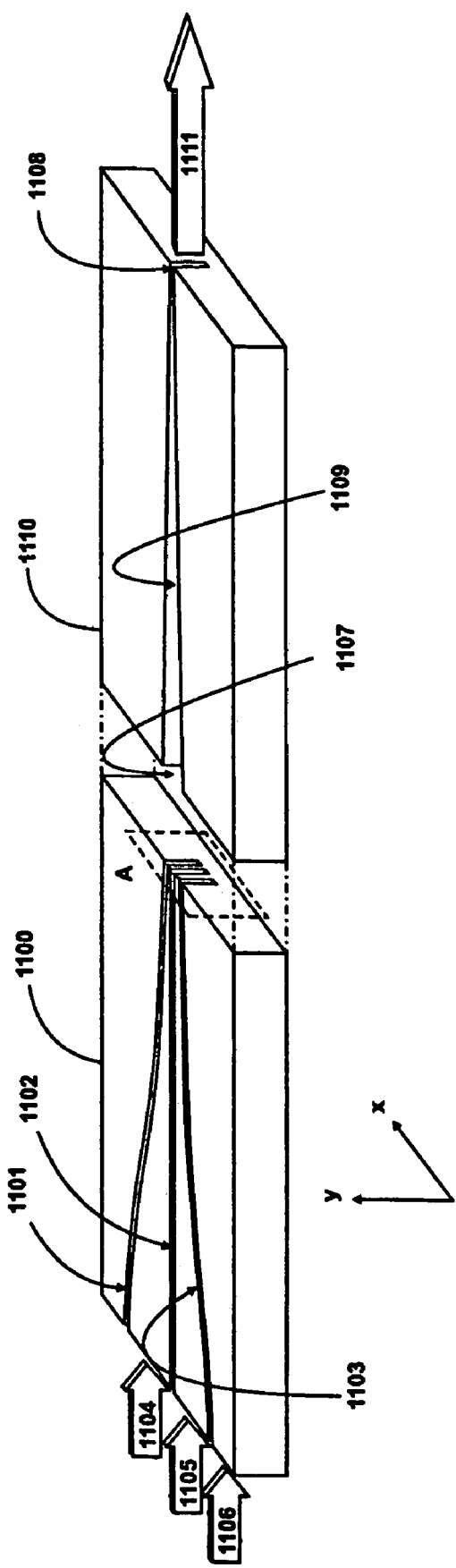
FIG. 11 illustrates a beam combination system of the invention drawn to illustrate an exemplary method of constructing waveguides suitable for beam combination and transport and the system is shown to include two sections, i.e., a transport section and a beam combination section.

For completeness we illustrate an exemplary method to construct waveguides suitable for beam combination and transport, as built by the inventors. As illustrated in FIG. 11, the system is formed from two sections, i.e., a transport section 1100 and a beam combination section 1110. In this example, the beams are unguided in the y-direction and guided in the x-direction. Solid metal blocks are used and transport section waveguides 1101-1103 were formed by EDM (electrical discharge machining). This process cuts deep waveguide grooves into the metal block with sufficient depth that the beam remains unguided in the y-direction over the propagation path from input to output. Input beams 1104-1106 are injected at the input end and transported by self-imaging along a curved path to output plane A. Although the transport section is not required for operation of the invention, it is clear from the drawing that the separation between the output beams at plane A is significantly smaller than the separation at the input. This has the advantage of easing the design of mechanical parts at the input.

During operation, transport section 1100 is close-coupled to beam combiner section 1110 but is shown in FIG. 11 as separated along the phantom lines. Beam combination section 1110 has a single waveguide channel 1109 cut into it, such as by using EDM techniques such as those used for the transport section 1100. The width of channel 1109 is greater at the input end 1107 than at the output end 1108. This type of design has been used by the inventors to demonstrate both guiding and tapered waveguide beam combination.

It is stressed that the preceding description of forming hollow waveguides in metal blocks using EDM is only an example of how useful structures can be constructed. Those skilled in the art will appreciate that numerous approaches may be taken to construct similar devices. These include, but are not limited to: constructing waveguide assemblies from multiple separate parts instead of one solid piece; using materials other than solid metals; and using surface coating techniques in place of EDM or other milling approaches.

The discussion above has generally referred to the waveguides as hollow as that is one preferred case where very high power are involved. However, the principles of the invention apply to waveguides filled with solids, liquids, or gases, in particular to waveguides made from solid dielectric materials surrounded by a material with lower refractive index, such as air, and where the guiding is effected through total internal reflection. Although the motivation for coherent beam combination is sometimes driven by high power or high energy applications, nothing in this disclosure should be construed as limiting the applicability to specific lasers, wavelengths, power levels, or similar parameters.

It is further emphasized that while the specific cases of waveguides simulated have had dimensions on the order of tens of centimeters in length. This is only because the assumed input beams are relatively large. With smaller beams, smaller waveguides can be used. Although the invention does not rely on the conventional self-imaging effect, the Talbot length $L=4nh^2/\lambda$ (where n is the refractive index of the waveguide and equals 1 for a hollow waveguide) is a useful scale parameter. Integrated optics may use waveguide heights on the order of 0.01 mm. If the material is silica (n~1.45), the corresponding Talbot length at $\lambda=1.55$ μm is less than 0.5 mm. This shows that with proper design of the waveguide dimensions it is possible to sharply reduce the size of devices.

It is further evident that waveguide propagation is reciprocal so that propagation in uptapered waveguides, where the input height is smaller than the output height, is also possible. For example, inputting a single beam at what is the output end in FIG. 3, will result in 2 or 4 output beams appearing at what is the input end in FIG. 3. In such a case the device operates as a beam splitter rather than a beam combiner.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. An apparatus for transforming laser beams, comprising:
   a waveguide comprising:
      a first elongate element having a planar reflective surface;
      a second elongate element having a planar reflective surface, wherein the first and second elongate elements are positioned such that the planar reflective surfaces are facing and are spaced apart a distance;
      an input at a first end of the first and second elongate elements; and
      an output at a second end of the first and second elongate elements; and
   means for directing a beam having a first intensity profile to the input of the waveguide, wherein the distance between the first and second elongate elements differs at the input and the output such that the waveguide is tapered and wherein the beam at the output of the waveguide has a second intensity profile differing from the first intensity profile,
   wherein the waveguide is tapered at an angle between about 0.1 and 5 mrad.

2. The apparatus of claim 1, wherein the first and second elongate elements have substantially equivalent lengths and wherein the lengths and the distances at the input and the output of the waveguide are selected such that the second intensity profile matches a predetermined intensity profile.

3. The apparatus of claim 2, wherein the predetermined intensity profile is a substantially Gaussian profile.

4. The apparatus of claim 1, wherein the input beam comprises a plurality of laser beams and the beam at the output comprises substantially a single coherently combined laser beam.

5. The apparatus of claim 4, wherein the directing means comprises means for controlling a phase of at least a portion of the plurality of beams to lock the phases of the portion of beams to control a quality criterion for the combined laser beam.

6. The apparatus of claim 5, wherein the quality criterion is selected from the group of criterion consisting of on-axis intensity, beam intensity uniformity, sidelobe suppression, and the Strehl ratio.

7. The apparatus of claim 5, wherein the phase controlling means comprises phase adjusters for each of the at least a portion of the beams to individually control phase and wherein the directing means further comprises beam diagnostic means for measuring a beam quality of the beam at the output relative to the quality criterion and a servo system operable to adjust the phase controlling means in response to the beam diagnostic means to perform the phase locking.

8. The apparatus of claim 7, wherein the servo system implements multi-dithering to perform the phase locking.

9. The apparatus of claim 7, wherein the servo system uses a neural network to perform the phase locking.

10. The apparatus of claim 7, wherein phase controlling means comprise liquid crystal devices, electro-optic devices, electro-mechanical devices, or acousto-optic devices.

11. The apparatus of claim 1, wherein the waveguide is two-dimensional and wherein the input and the output have substantially square cross sections transverse to a path of the beam.

12. An apparatus for combining two or more laser beams from one or more sources into an output beam, comprising:
a waveguide comprising an inlet and an outlet at opposite ends of two waveguide elements each having a planar reflective surface facing into the waveguide, wherein the reflective surfaces are non-parallel such that a height of the inlet differs from a height of the outlet; and
a beam input assembly operable to control a phase of each of two or more laser beams input at the inlet to produce a coherently combined laser beam at the outlet of the waveguide,
wherein the waveguide is tapered at an angle between about 0.1 and 5 mrad.

13. The apparatus of claim 12, wherein the beam input assembly comprises a laser beam source outputting a beam, a beam splitter device splitting the output beam from the source into two or more laser beams of lower power, and a phase control device for phase locking at least two of the two or more laser beams to generate the two or more laser beams input to the inlet of the waveguide.

14. The apparatus of claim 12, wherein the height of the inlet is greater than the height of the outlet of the waveguide and wherein a taper angle defined by each of the planar reflective surfaces is substantially equivalent.

15. The apparatus of claim 14, wherein the combined laser beam at the waveguide outlet has a substantially Gaussian intensity profile.

16. The apparatus of claim 15, wherein the planar surfaces have substantially equal lengths, and wherein the lengths are selected based on the height of the inlet to produce the substantially Gaussian intensity profile in the combined laser beam at the outlet.

17. The apparatus of claim 12, wherein the beam input assembly comprises phase adjusters for each of the input laser beams to individually control phase and wherein the beam input assembly further comprises means for measuring an intensity of the beam at the outlet and a servo system operable responsive to the intensity measuring means to adjust the phase adjusters to lock the phases of the laser beams at the waveguide inlet.

18. A beam combination system for combining laser beams, comprising:
a waveguide comprising an inlet and an outlet at opposite ends of two waveguide elements each having a planar reflective surface facing into the waveguide, wherein the planar reflective surfaces are non-parallel such that a height of the inlet is greater than a height of the outlet, with the heights being measured as a distance between the waveguide elements; and
a beam input assembly operable to control a phase of each of two or more laser beams input at the inlet of the waveguide, wherein the phases are locked to a substantially single phase and the two planar waveguide elements have lengths selected to produce a coherently combined laser beam at the outlet of the waveguide,
wherein the waveguide is tapered at an angle between about 0.1 and 5 mrad.

19. The system of claim 18, wherein the beam input assembly includes means for inputting a plurality of laser beams in a two-dimensional manner and means for adjusting the phase of the plurality of laser beams to generate the input two or more laser beams having the substantially single phase including means for measuring an intensity profile of the coherently combined laser beam and for providing a control signal to the phase adjusting means based on the measured intensity profile.

20. The system of claim 19, wherein the control sign is provided to control the phases of the plurality of laser beams so that the measure intensity profile is a substantially Gaussian profile and wherein the inlet and the outlet of the waveguide are substantially square in cross section.

* * * * *